US 6,641,224 B1

(12) United States Patent
Heck et al.

(10) Patent No.: US 6,641,224 B1
(45) Date of Patent: Nov. 4, 2003

(54) FULL FACE VEHICLE WHEEL FOR USE IN A HIGH OFFSET DUAL VEHICLE WHEEL ASSEMBLY

(75) Inventors: Thomas E. Heck, Monroe, MI (US); William J. Fysh, Plymouth, MI (US); Gary Arnold, Monroe, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/148,861

(22) PCT Filed: Dec. 17, 1999

(86) PCT No.: PCT/US99/30166
§ 371 (c)(1),
(2), (4) Date: Jun. 5, 2002

(87) PCT Pub. No.: WO01/43991
PCT Pub. Date: Jun. 21, 2001

(51) Int. Cl.[7] .............................. B60B 25/00; B60B 3/10
(52) U.S. Cl. ................................ 301/13.2; 301/63.106; 301/63.104; 301/63.105
(58) Field of Search ............................ 301/63.106, 36.1, 301/36.3, 13.2, 13.1, 95.101, 95.109, 95.11, 99, 95.104, 63.103, 63.104, 63.105, 95.105, 95.106, 95.107, 95.108; 152/376

(56) References Cited

U.S. PATENT DOCUMENTS

| | | | | |
|---|---|---|---|---|
| 2,283,860 A | * | 5/1942 | Manning | 301/36.1 |
| 2,625,438 A | * | 1/1953 | Horn | 301/35.626 |
| 2,642,316 A | * | 6/1953 | Frandi | 301/36.1 |
| 4,070,066 A | * | 1/1978 | Reppert et al. | 301/36.1 |
| 4,135,765 A | * | 1/1979 | Hardwicke | 301/36.1 |
| 4,772,074 A | * | 9/1988 | Brieser et al. | 301/35.628 |
| 5,435,632 A | * | 7/1995 | Gajor et al. | 301/63.105 |
| 5,435,633 A | * | 7/1995 | Jaskierny | 301/63.105 |
| 5,634,694 A | * | 6/1997 | Murray et al. | 301/63.103 |
| 5,639,147 A | * | 6/1997 | Hill et al. | 301/63.107 |
| 6,193,321 B1 | * | 2/2001 | Cvijanovic et al. | 301/63.107 |
| 6,354,667 B1 | * | 3/2002 | Cochran et al. | 301/63.104 |

FOREIGN PATENT DOCUMENTS

FR    2518933    * 1/1983 ............ 301/63.105

* cited by examiner

*Primary Examiner*—S. Joseph Morano
*Assistant Examiner*—Long Bao Nguyen
(74) *Attorney, Agent, or Firm*—MacMillan, Sobanski & Todd, LLC

(57) ABSTRACT

A high offset dual vehicle wheel assembly includes a pair of full face wheels (20, 20) each defining an axis and including a wheel rim and a full face wheel disc. The rim includes an inboard tire bead seat retaining flange, an inboard tire bead seat, a generally axially extending well, and an outboard tire bead seat surface. The disc (42) includes a centrally located wheel mounting flange and an outer annular portion which defines an outboard tire bead seat retaining flange of the vehicle wheel and is located wholly outside a plane defined by the inboard tire bead seat retaining flange. The inboard tire bead seat (38) is provided with a radially in-turned flange having a generally radially inwardly sloping surface, a generally radially extending surface, and an axially extending surface. When the in-turned flange of the rim is positioned against an adjacent inner surface of the disc, a recess is formed between the inwardly sloping surface of the in-turned flange and the inner surface of disc, and a welding area is formed between the axially extending surface of the in-turned flange and the inner surface of disc. The recess (58) defines a groove for receiving a first weld (60), and the welding area defines an area for receiving a second weld (62). The welds cooperate to join the rim (30) and disc together and produce the full face vehicle wheel.

18 Claims, 4 Drawing Sheets

FULL FACE VEHICLE WHEEL FOR USE IN A HIGH OFFSET DUAL VEHICLE WHEEL ASSEMBLY

BACKGROUND OF THE INVENTION

This invention relates in general to vehicle wheels and in particular to an improved structure for a high offset full face vehicle wheel adapted for use in a high offset dual vehicle wheel assembly.

A conventional dual vehicle wheel assembly includes a pair of vehicle wheels which are secured to a rear axle flange of an associated vehicle for supporting a pair of tires in a side-by-side relationship. Basically, there are four main types of rear dual vehicle wheels for light, medium, or heavy duty vehicles, namely "fabricated" dual wheels, "forged" dual wheels, cast aluminum dual is wheels, and "combination" dual wheels.

A conventional fabricated dual wheel includes an inner wheel and an outer wheel which are connected together to form the dual wheel. Each of the associated inner and outer wheels is of a two-piece construction and includes an inner wheel disc and an outer wheel rim. The wheel disc is fabricated from steel, and includes a centrally located wheel mounting surface. The wheel mounting surface is provided with a center pilot or hub hole, and a plurality of lug receiving holes for mounting the wheel to an axle of the vehicle. The wheel rim is fabricated from steel, and includes an inboard tire bead seat retaining flange, an inboard tire bead seat, an axially extending well. an outboard tire bead seat, and an outboard tire bead seat retaining flange. The wheel disc and the wheel rim are joined together during a welding operation in one of two manners. Either, the wheel disc is joined to the wheel rim in the region of the bead seat to produce a "bead-seat attached" wheel, or the wheel disc is welded to the wheel rim in the region of the well to produce a "drop well attached" wheel. Then, the inner wheel and outer wheel are disposed with their discs adjacent one another and with the lug holes of each aligned so that lug bolts can extend through the holes to secure the inner and outer wheels to the axle.

A full face vehicle wheel is distinguished from other types of vehicle wheels by having a one-piece wheel disc construction. In particular, the full face wheel includes a "full face" wheel disc and a "partial" wheel rim. The full face wheel disc can be cast, forged, or fabricated from steel, aluminum, or other alloys. The full face wheel disc includes an inner annular wheel mounting portion and an outer annular portion which defines at least a portion of an outboard tire bead seat retaining flange of the vehicle wheel. The wheel mounting portion of the full face wheel disc defines an inboard mounting surface and includes a center pilot or hub hole, and a plurality of lug receiving holes formed therethrough for mounting the vehicle wheel to an axle of the vehicle. The partial wheel rim is fabricated from steel, aluminum, or other alloys, and includes an inboard tire bead seat retaining flange, an inboard tire bead seat, an axially extending well, and an outboard tire bead seat. In some instances, the outboard tire bead seat of the wheel rim and the outer annular portion of the disc cooperate to form the outboard tire bead seat retaining flange of the full face wheel. In both types of constructions, the outboard tire bead seat of the wheel rim is positioned adjacent the outer annular portion of the wheel disc and a weld is applied at the tire side of the vehicle wheel assembly to secure the wheel rim and the wheel disc together.

SUMMARY OF THE INVENTION

A full face vehicle wheel usually used on single wheel applications is of a "low offset" design. The term low offset as used herein refers to the distance that the wheel mounting flange of the full face wheel disc is located axially away from the center of the wheel rim. Applicants have discovered that using a full face vehicle wheel in a "high offset" dual vehicle wheel application, present certain problems concerning customer specifications for fatigue load due to the high offset loads which are produced when using the pair of full face vehicle wheels in a high offset dual vehicle wheel application.

The present invention relates to an improved structure for a pair of full face vehicle wheels which are adapted for use in a high offset dual vehicle wheel assembly. Each of the full face vehicle wheels defines an axis and includes a wheel rim and a full face wheel disc. The wheel rim includes an outboard tire bead seat retaining flange, an outboard tire bead seat, a generally axially extending well, and an inboard tire bead seat surface. The wheel disc includes a body having a centrally located wheel mounting flange and an outer annular portion. The outer annular portion of the wheel disc defines an inboard tire bead seat retaining flange of full face vehicle wheel. The wheel mounting flange of the wheel disc is located wholly outside a plane defined by the inboard tire bead seat retaining flange. The inboard tire bead seat is provided with a radially in-turned flange. The in-turned flange includes a generally radially inwardly sloping surface, a generally radially extending surface, and an axially extending surface. When the radially extending surface of the in-turned flange is positioned against an adjacent inner surface of the inboard tire bead seat retaining flange of the wheel disc, a recess is formed between the inwardly sloping surface of the in-turned flange and the inner surface of inboard tire bead seat retaining flange, and a welding area is formed between the axially extending surface of the in-turned flange and the inner surface of inboard tire bead seat retaining flange. The recess defines an axially extending groove for receiving a first weld, and the welding area defines an area for receiving a second weld. The first and second welds cooperate to join the wheel rim. and wheel disc together and produce the full face vehicle wheel. As a result, a "value added" dual vehicle wheel assembly is provided having increased styling variation compared to a conventional (i.e., non-full face) dual vehicle wheel assembly.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
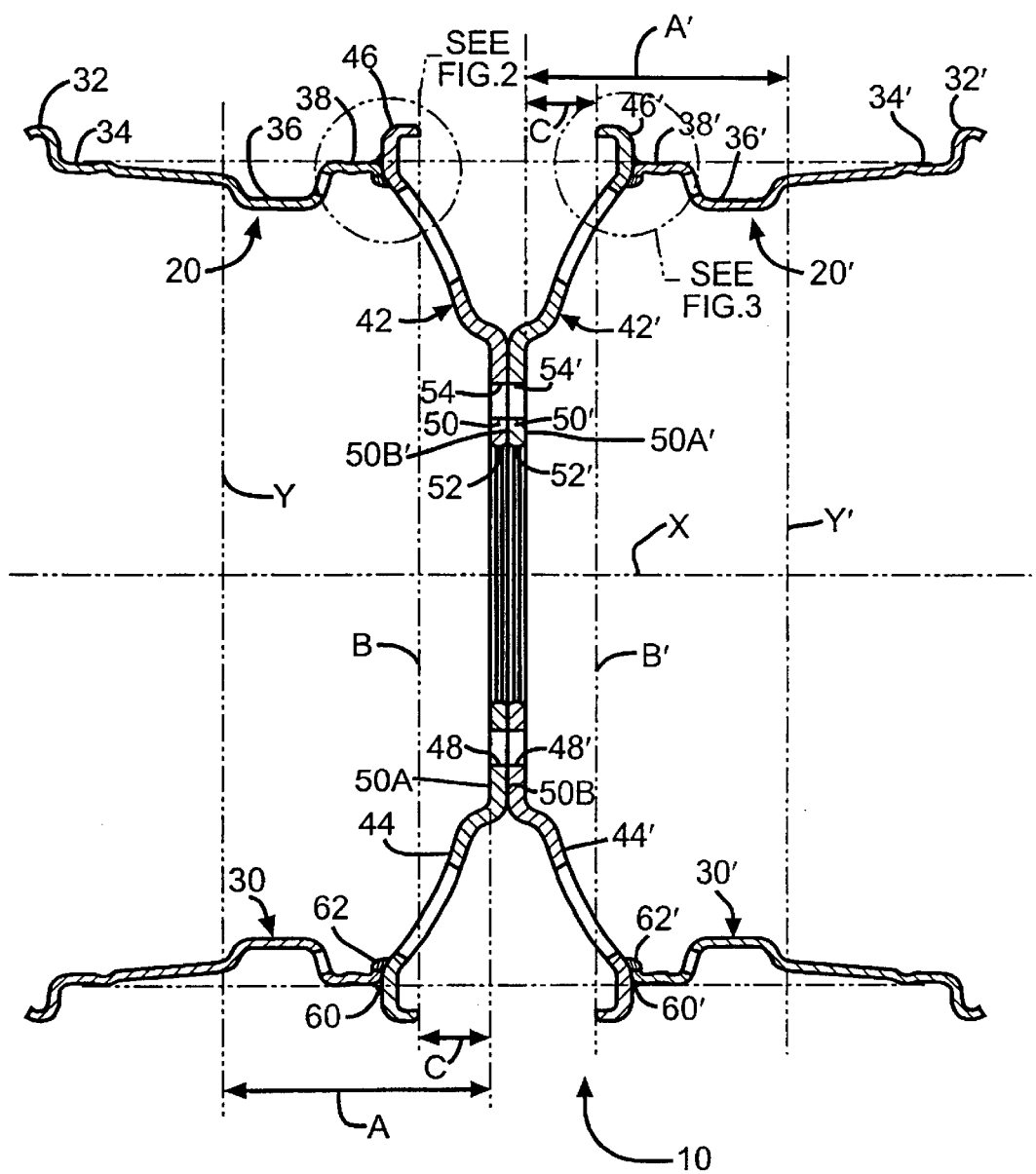
FIG. 1 is a sectional view of a first embodiment of a high offset full face dual vehicle wheel assembly including a pair of full face vehicle wheels constructed in accordance with the present invention

Referring now to the drawings, there is illustrated in FIG. 1 an improved structure for a high offset full face dual vehicle wheel assembly, indicated generally at 10, including a pair of individual full face vehicle wheels 20 and 20', in accordance with the present invention. The high offset full face dual vehicle wheel assembly 10 of the present invention defines a longitudinal dual vehicle wheel assembly axis X and is adapted to support a pair of tires (not shown). In the illustrated embodiment, the full face vehicle wheels 20 and 20' are essentially mirror images of one another. Alternatively, the full face vehicle wheels 20 and 20' can be different from one another if desired. Also, for discussion purposes, the full face dual vehicle wheel assembly 10 will be discussed as being a rear left dual wheel assembly for a vehicle, wherein the full face vehicle wheel 20 defines an outer vehicle wheel and the full face vehicle wheel 20' defines an inner vehicle wheel of the dual vehicle wheel assembly 10. The dual vehicle wheel assembly 10 of the present invention is preferably for use in conjunction with light, medium, or heavy duty vehicles, but can also be used with commercial vehicles if desired.

The outer full face vehicle wheel 20 defines a transverse wheel center axis Y which is perpendicular to the longitudinal dual vehicle wheel axis X. The outer full face vehicle wheel 20 includes a generally annular rim 30 and a generally annular full face wheel disc 42. The rim 30 is a fabricated wheel rim and is preferably constructed of steel. However, the rim 30 can be formed from other materials, such as for example aluminum or alloys thereof. The rim 30 includes an outboard tire bead seat retaining flange 32, an outboard tire bead seat 34, a generally axially extending well 36, and an inboard tire bead seat 38.

Figure 2:
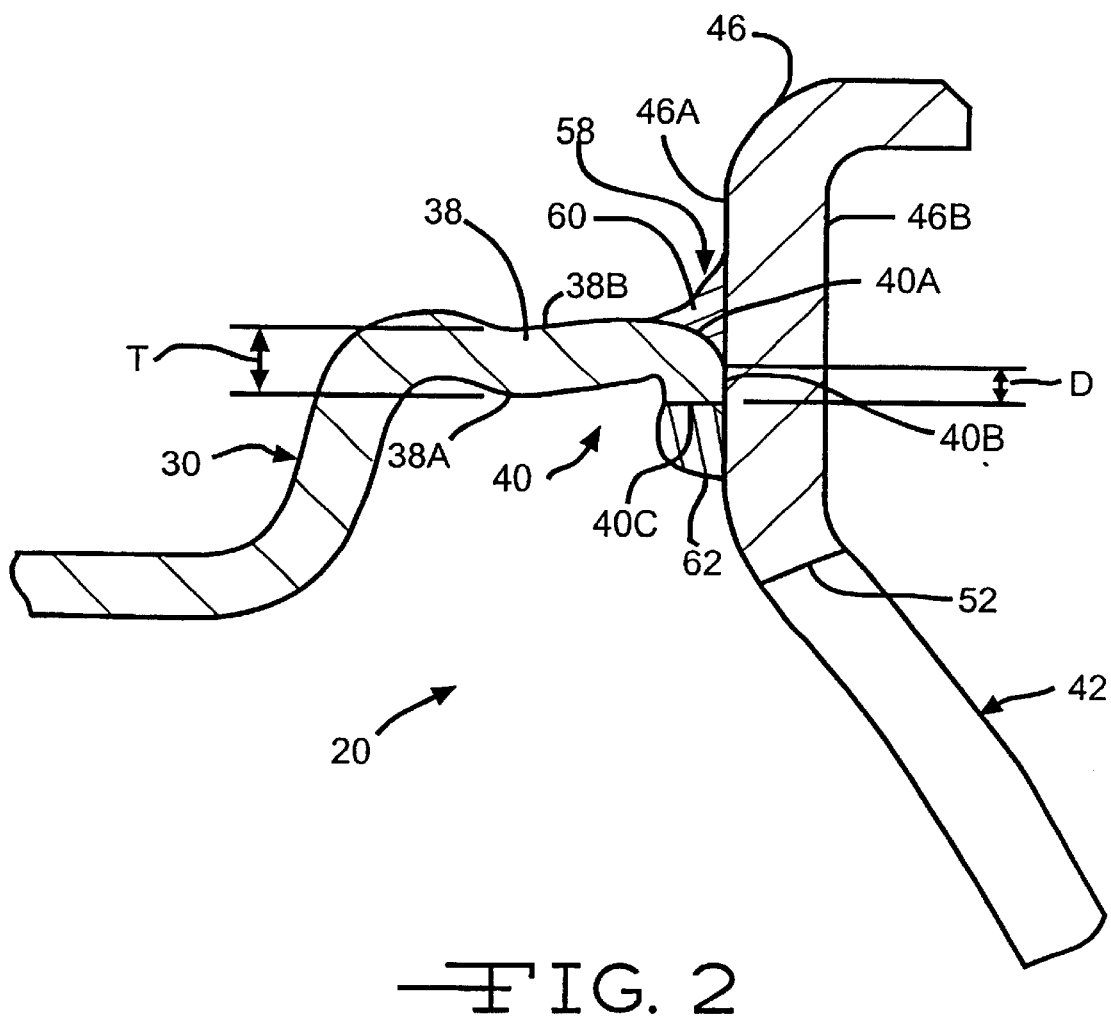
FIG. 2 is an enlarged sectional view of a portion of one of the vehicle wheels illustrated in FIG. 1.

As best shown in FIG. 2, the end of the inboard tire bead seat 38 of the wheel rim 30 is provided with a radially in-turned flange 40. The in-turned flange 40 includes a radially inwardly sloping surface 40A, a radially extending surface 40B, and an axially extending surface 40C. Preferably the surfaces 40A, 40B and 40C are formed surfaces and attain the tolerances required to accurately assemble and produce the finished full face wheel. Alternatively, one or more of the surfaces 40A, 40B and 40C can be machined to predetermined tolerances.

The wheel disc 42 is a forged, cast or fabricated disc and is preferably constructed of steel. However, the wheel disc 42 can be formed from other materials, such as for example aluminum or alloys thereof. The wheel disc 40 includes an outer annular portion 44 and a generally centrally located wheel disc mounting flange 50. The outer annular portion 44 of the wheel disc 42 defines an inboard tire bead seat retaining flange 46 of the vehicle wheel 20, and includes a generally radially extending inner surface 46A and a generally radially extending outer surface 46B. Preferably, the surfaces 46A and 46B are formed surfaces and attain the tolerances required to accurately assemble and produce the finished full face wheel. Alternatively, one or more of the surfaces 46 and 46B can be machined to predetermined tolerances. The wheel disc 42 may also include a plurality of decorative openings or windows 48 (only two of such decorative openings 48 illustrated in FIG. 1) formed therein.

The wheel disc mounting flange 50 is provided with a centrally located pilot aperture 52, and a plurality of lug bolt receiving holes 54 (only two of such lug bolt holes 54 being illustrated). As will be discussed below, the lug bolt receiving holes 54 receive lug bolts and nuts (not shown) for securing the wheels 20 and 20' on an axle (not shown) of a vehicle.

The wheel disc mounting flange 50 of the wheel disc 42 defines an inner wheel disc mounting flange surface 50A and an outer wheel disc mounting flange surface 50B which is generally parallel to the inner wheel disc mounting flange surface 50A. The inner wheel disc mounting surface 50A extends a predetermined axial distance A relative to the wheel axis Y which is operative to position the wheel disc mounting flange 50 a predetermined axial distance C which is wholly outside a plane B defined by an outermost end of the inboard tire bead seat retaining flange 46. As a result, the outer vehicle wheel 20 is a "high offset" type of vehicle wheel. The term high offset refers to the axial distance that the wheel disc mounting flange 50 is located axially away from the center vertical axis Y of the wheel rim 30 or the plane B of the outermost end of the inboard tire bead seat retaining 46 of the wheel disc 40. Typically, the distance A is in the range from about 3 inches (76 mm) to about 6 inches (152 mm) for a steel vehicle wheel, and from about 3 inches (76 mm) to about 6 inches (152 mm) for an aluminum vehicle wheel, and the distance C is in the range from about 0 inches to about 3 inches (76 mm) for a steel vehicle wheel, and from about 0 inches to about 3 inches (76 mm) for an aluminum vehicle wheel. Preferably, the distance A is in the range from about 3 inches (76 mm) to about 5 inches (127 mm) for a steel vehicle wheel, and from about 3 inches (76 mm) to about 5 inches (127 mm) for an aluminum vehicle wheel, and the distance C is in the range from about 1.5 inches (38 mm) to about 2.5 inches (63.5 mm) for a steel vehicle wheel, and from about 1.5 inches to about 2.5 inches for an aluminum wheel. More preferably, the distance A is approximately 4 inches (101.5 mm) for a steel vehicle wheel and approximately 4 inches for an aluminum vehicle wheel, and the distance C is approximately 2 inches (51 mm) for a steel vehicle wheel and approximately 2 inches for an aluminum vehicle wheel.

To assemble the vehicle wheel 20, the radially extending surface 40B of the wheel rim 30 is positioned on the radially extending inner surface 46A of the wheel disc 42 so that the radially inwardly sloping surface 40A of the wheel rim 30 cooperates with the inner surface 46A of the inboard tire bead seat retaining flange 46 of the wheel disc 42 to form a recess or trench, indicated generally at 58. The recess 58 defines an axially extending groove therein which receives a first circumferential weld 60. In addition, due to the high offset structure of the vehicle wheel 20, a second weld 62 is deposited between the axially extending surface 40C of the wheel rim 30 and the inner surface 46A of the wheel disc 42. The first weld 60 and the second weld 62 are effective to join the wheel rim 20 and the wheel disc 42 together to produce the vehicle wheel 20. In the preferred embodiment, the first weld 60 and the second weld 62 are continuous, uninterrupted, circumferential welds. However, the welds 60 and 62 can be other than illustrated if desired. For example, one of the welds 60 and 62 can be a continuous, uninterrupted, circumferential weld and the other one of the welds 60 and 62 can be a non-continuous, interrupted weld.

In order to ensure that the first weld 60 and the second weld 62 do not burn through to contact one another and affect the integrity of the associated weld joints, the radially extending surface 40B of the wheel disc 42 extends a predetermined minimum generally radially extending distance D. To accomplish this, the radial distance D is at least about one-half the thickness T of the associated wheel rim 30 in the region of the inboard tire bead seat 38 between an inner surface 38A and an outer surface 38B thereof. For example, the distance D is at least from about $\frac{5}{64}$ inch to about $\frac{13}{64}$ inch (2 mm to 5 mm) for a steel wheel rim 30, and at least from about $\frac{5}{64}$ inch to about $\frac{13}{64}$ inch (2 mm to 5 mm) for an aluminum wheel rim 30. Preferably, the distance D is from about 8/64 inch to about 10/64 inch (3 mm to 4 mm) for a steel wheel rim 30 and from 8/64 inch to about 10/64 inch (3 mm to 4 mm) for an aluminum wheel rim 30. Alternatively, the particular configuration of the outermost end of the inboard tire bead seat 38 of the wheel rim 30 can be other than illustrated if desired. However, as discussed above, the particular configuration of the outermost end of the inboard tire bead seat 38 of the wheel rim 30 should be effective to ensure that the first weld 60 and the second weld 62 do not burn through to contact one another and thereby affect the integrity of the associated weld joints.

The inner full face vehicle wheel 20' defines a transverse wheel center axis Y' which is perpendicular to the longitudinal dual vehicle wheel axis X. The inner full face vehicle wheel 20' includes a generally annular rim 30' and a generally annular full face wheel disc 42'. The rim 30' is a fabricated wheel rim and is preferably constructed of steel. However, the rim 30' can be formed from other materials, such as for example aluminum or alloys thereof. The rim 30' includes an outboard tire bead seat retaining flange 32', an outboard tire bead seat 34', a generally axially extending well 36', and an inboard tire bead seat 38'.

Figure 3:
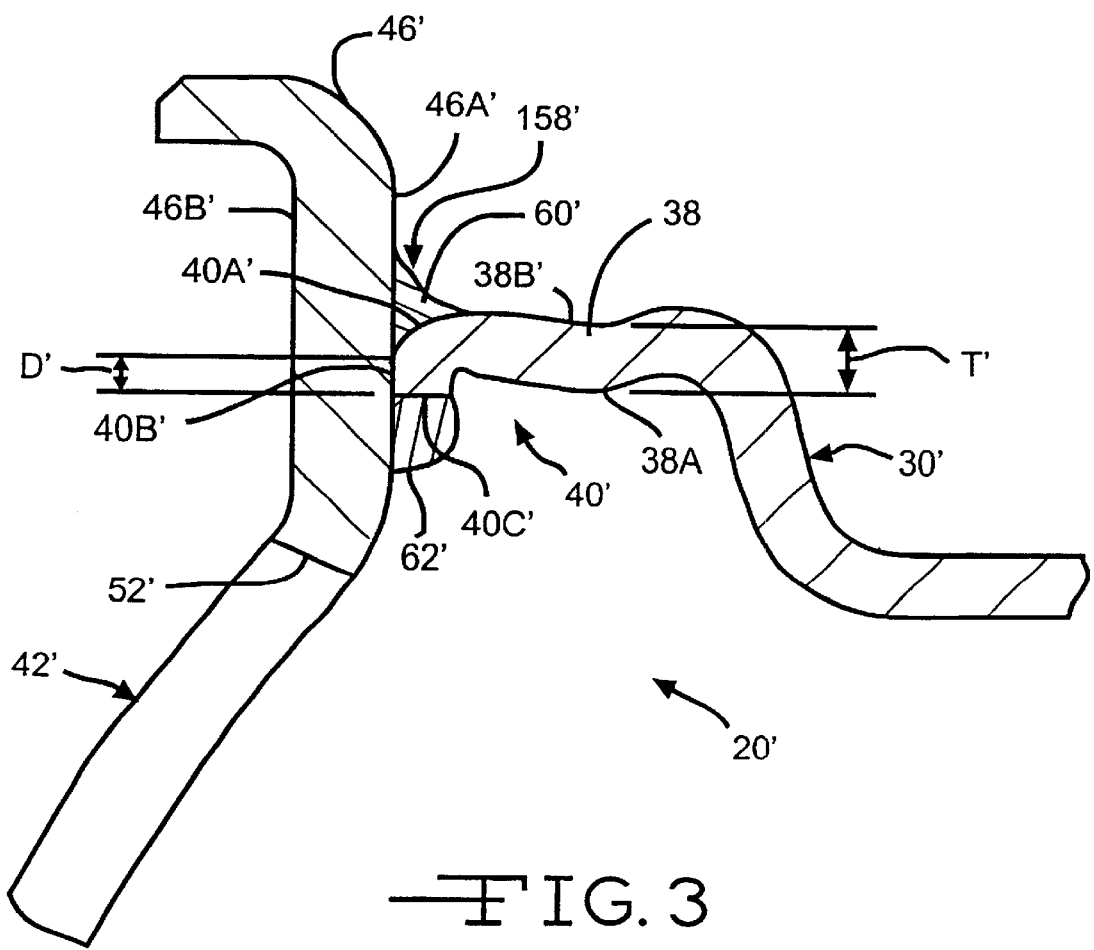
FIG. 3 is an enlarged sectional view of a portion of the other one of the vehicle wheels illustrated in FIG. 1.

As best shown in FIG. 3, the end of the inboard tire bead seat 38' of the wheel rim 30' is provided with a radially in-turned flange 40'. The in-turned flange 40' includes a radially inwardly sloping surface 40A', a radially extending surface 40B', and an axially extending surface 40C'. These surfaces 40A', 40B', and 40C'. Preferably, the surfaces 40A', 40B' and 40C' are formed surfaces and attain the tolerances required to accurately assemble and produce the finished full face wheel. Alternatively, one or more of the surfaces 40A', 40B' and 40C' can be machined to predetermined tolerances.

The wheel disc 42' is a forged, cast or fabricated disc and is preferably constructed of steel. However, the wheel disc 42' can be formed from other materials, such as for example aluminum or alloys thereof. The wheel disc 40' includes an outer annular portion 44' and a generally centrally located wheel mounting flange 50'. The outer annular portion 44' of the wheel disc 42' defines an inboard tire bead seat retaining flange 46' of the vehicle wheel 20', and includes a generally radially extending inner surface 46A' and a generally radially extending outer surface 46B'. Preferably, the surfaces 46A' and 46B' are formed surfaces and attain the tolerances required to accurately assemble and produce the finished full face wheel. Alternatively, one or more of the surfaces 46' and 46B' can be machined to predetermined tolerances. The wheel disc 42' may also include a plurality of decorative openings or windows 48' (only two of such decorative openings 48' illustrated in FIG. 1) formed therein.

The wheel disc mounting flange 50' is provided with a centrally located pilot aperture 52', and a plurality of lug bolt receiving holes 54' (only two of such lug bolt holes 54' being illustrated). As will be discussed below, the lug bolt receiving holes 54' receive lug bolts and nuts (not shown) for securing the wheels 20 and 20' on an axle (not shown) of a vehicle.

The wheel disc mounting flange 50' of the wheel disc 42' defines an inner wheel disc mounting flange surface 50A' and an outer wheel disc mounting flange surface 50B' which is generally parallel to the inner wheel disc mounting flange surface 50A'. The inner wheel disc mounting surface 50A' extends a predetermined axial distance A' relative to the wheel axis Y' which is operative to position the wheel disc mounting flange 50' wholly outside a plane B' defined by an outermost end of the outboard tire bead seat retaining flange 46'. As a result, the outer vehicle wheel 20' is a "high offset"

type of vehicle wheel. Typically, the distance A is in the range from about 3 inches to about 6 inches for a steel vehicle wheel, and from about 3 inches to about 6 inches for an aluminum vehicle wheel, and the distance C is in the range from about 0 inches to about 3 inches for a steel vehicle wheel, and from about 0 inches to about 3 inches for an aluminum vehicle wheel. Preferably, the distance A is in the range from about 3 inches to about 5 inches for a steel vehicle wheel, and from about 3 inches to about 5 inches for an aluminum vehicle wheel, and the distance C is in the range from about 1.5 inch to about 2.5 inches for a steel vehicle wheel, and from about 1.5 inches to about 2.5 inches for an aluminum wheel. More preferably, the distance A is approximately 4 inches for a steel vehicle wheel and approximately 4 inches for an aluminum vehicle wheel, and the distance C is approximately 2 inches for a steel vehicle wheel and approximately 2 inches for an aluminum vehicle wheel.

To assemble the vehicle wheel 20', the radially extending surface 40B' of the wheel rim 30' is positioned on the radially extending inner surface 46A' of the wheel disc 42' so that the radially inwardly sloping surface 40A' of the wheel rim 30' cooperates with the inner surface 46A' of the inboard tire bead seat retaining flange 46' of the wheel disc 42' to form a recess or trench, indicated generally at 58'. The recess 58' defines an axially extending groove therein which receives a first circumferential weld 60'. In addition, due to the high offset structure of the vehicle wheel 20', a second weld 62' is deposited between the axially extending surface 40C' of the wheel rim 30' and the inner surface 46A' of the wheel disc 42. The first weld 60' and the second weld 62' are effective to join the wheel rim 20' and the wheel disc 42' together to produce the vehicle wheel 20'.

In order to ensure that the first weld 60' and the second weld 62' do not burn through to contact one another and affect the integrity of the associated weld joints, the radially extending surface 40B' of the wheel disc 42' extends a predetermined minimum generally radially extending distance D'. To accomplish this, the radial distance D' is at least about one-half the thickness T of the associated wheel rim 30' in the region of the inboard tire bead seat 38' between an inner surface 38A' and an outer surface 38B' thereof. For example, the distance D' is at least from about 2 mm to about 5 mm for a steel wheel rim 30' and at least from about 2 mm to about 5 mm for an aluminum wheel rim 30'. Preferably, the distance D' is from about 3 mm to about 4 mm for a steel wheel rim 30' and from about 3 mm to about 4 mm for an aluminum wheel rim 30'. Alternatively, the particular configuration of the outermost end of the inboard tire bead seat 38' of the wheel rim 30' can be other than illustrated if desired. However, as discussed above, the particular configuration thereof should be effective to ensure that the first weld 60' and the second weld 62' do not burn through to contact one another and thereby affect the integrity of the associated weld joints.

To produce the dual vehicle wheel assembly 10, the wheels 20 and 20' are positioned in a wheel disc to wheel disc relationship with their respective wheel disc mounting flanges 50 and 50' adjacent one another and with their respective lug bolt holes 54 and 54', coaxially aligned, as shown in FIG. 2. Then, the lug bolts (not shown) are inserted through the holes 54 and 54' to secure the dual vehicle wheel assembly 10 to the axle of the vehicle.

Figure 4:
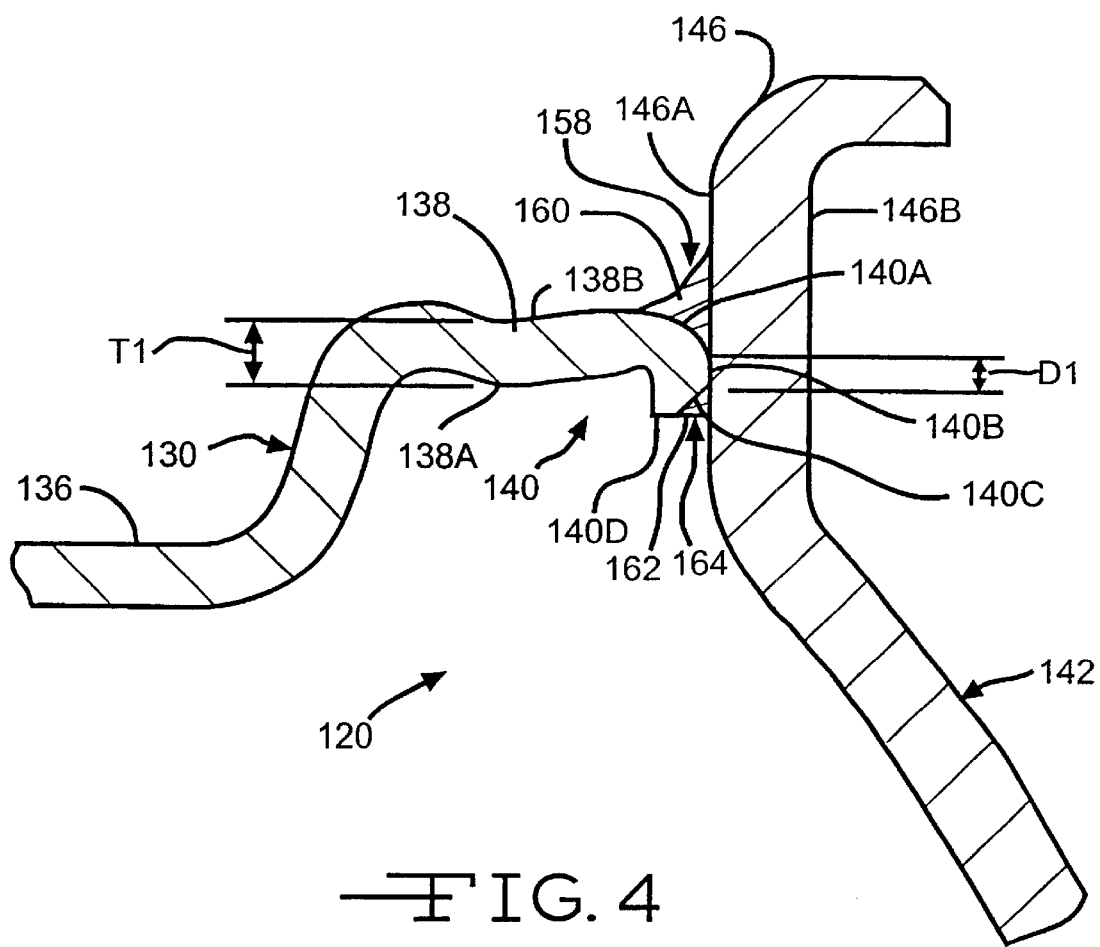
FIG. 4 is an enlarged sectional view of a portion of a second embodiment of a full face vehicle wheel which can be used to produce a high offset dual vehicle wheel assembly in accordance with the present invention.

Turning now to FIG. 4, there is illustrated a portion of a second embodiment of a vehicle wheel, indicated generally at 120, for use in a high offset full face dual vehicle wheel assembly in accordance with the present invention. As shown therein, the vehicle wheel 120 includes a wheel rim 130 and a wheel disc 142. The wheel rim 130 is a fabricated wheel rim and is preferably constructed of steel. However, the wheel rim 130 can be formed from other materials, such as for example aluminum or alloys thereof. The wheel rim 130 includes an outboard tire bead seat retaining flange (not shown), an outboard tire bead seat (not shown), a generally axially extending well 136, and an inboard tire bead seat 138. The inboard tire bead seat 138 includes an inner surface 138A and an outer surface 138B.

In this embodiment, the end of the inboard tire bead seat 138 of the wheel rim 130 is provided with a radially in-turned flange, indicated generally at 140. The in-turned flange 140 includes a radially inwardly sloping surface 140A, a generally radially extending surface 140B, a non-radially extending chamfered surface 140C, and a generally axially extending surface 140D. Preferably, the surfaces 140A, 140B, 140C and 140D are formed surfaces and attain the tolerances required to accurately assemble and produce the finished full face wheel 120. Alternatively, one or more of the surfaces 140A, 140B, 140C and 140D can be machined to predetermined tolerances. Also, alternatively, the particular profile of the surface 140C can be other than illustrated. For example, the surface 140C can be a radially outwardly sloping surface (not shown). However, as will be discussed below, it is preferred that the particular profile of the surface 140C is operative to define a trench between such surface 140C and the inner surface 146A of the wheel disc 142 for receiving a weld.

The wheel disc 142 is a forged, cast or fabricated disc and is preferably constructed of steel. However, the wheel disc 142 can be formed from other materials, such as for example aluminum or alloys thereof. The wheel disc 140 includes an outer annular portion 144 and a generally centrally located wheel mounting flange (not shown). The outer annular portion 144 of the wheel disc 42 defines an inboard tire bead seat retaining flange 146 of the vehicle wheel 120, and includes a generally radially extending inner surface 146A and a generally radially extending outer surface 146B. Preferably, the surfaces 146A and 146B are formed surfaces and attain the tolerances required to accurately assemble and produce the finished full face wheel. Alternatively, one or more of the surfaces 146 and 146B can be machined to predetermined tolerances. The wheel disc 142 may also include a plurality of decorative openings or windows (not shown) formed therein.

To assemble the vehicle wheel 120, the radially extending surface 140B of the wheel rim 130 is positioned on the radially extending inner surface 146A of the wheel disc 142 so that the radially inwardly sloping surface 140A of the wheel rim 130 cooperates with the inner surface 146A of the outboard tire bead seat retaining flange 146 of the wheel disc 142 to form a recess or trench indicated generally at 158. The recess 158 defines an axially extending groove therein which receives a first circumferential weld 160. In addition, due to the high offset structure of the vehicle wheel 120, a second weld 162 is deposited in a recess or trench, indicated generally at 164, defined between the non-radially extending chamfered surface 140C of the wheel rim 130 and the inner surface 146A of the wheel disc 142. The first weld 160 and the second weld 162 are effective to join the wheel rim 130 and the wheel disc 142 together to produce the vehicle wheel 120.

In order to ensure that the first weld 160 and the second weld 162 do not burn through to contact one another and affect the integrity of the associated weld joints, the radially extending surface 140B of the wheel disc 142 extends a predetermined minimum generally radially extending distance D1. To accomplish this, the radial distance D1 is at least about one-half the thickness T1 of the associated wheel rim 130 in the region of the inboard tire bead seat 138 between an inner surface 138A and an outer surface 138 thereof. For example, is the distance D1 is at least about 2 mm to about 5 mm for a steel wheel rim 130 and at least about 2 mm to about 5 mm for an aluminum wheel rim 130. Preferably, the distance D1 is from about 3 mm to about 4 mm for a steel wheel rim 130 and from about 3 mm to about 4 mm for an aluminum wheel rim 130. Alternatively, the particular configuration of the outermost end of the outboard tire bead seat 138 of the wheel rim 130 can be other than illustrated if desired. However, as discussed above, the particular configuration of the outermost end of the outboard tire bead seat 138 of the wheel rim 130 should be effective to ensure that the first weld 160 and the second weld 162 do not burn through to contact one another and thereby affect the integrity of the associated weld joints.

One advantage of the present invention is that a full face type of vehicle wheel can be used in a dual vehicle wheel assembly which is of a high offset design. As a result, a higher "value added" dual vehicle wheel assembly is provided having increased styling variation compared to a conventional (i.e., non-full face) dual vehicle wheel assembly. Also, the dual vehicle wheel assembly of this invention allows the associated vehicle wheel to be chrome plated, to receive a permanently attached chrome-plated, painted, polished, or other finished wheel cover, or in the case of an aluminum wheel, to impart a high polished surface to the vehicle wheel all without having an exposed weld joint between the wheel disc and the wheel rim as occurs in a convention (i.e., non-full face) dual vehicle wheel assembly.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A high offset dual vehicle wheel assembly comprising:
an inner full face vehicle wheel defining an axis and including a wheel rim and a full face wheel disc, said wheel rim including an outboard tire bead seat retaining flange, an outboard tire bead seat, a generally axially extending well, and an inboard tire bead seat surface, said wheel disc including a body having a centrally located wheel mounting flange and an outer annular portion, said outer annular portion of said wheel disc defining an inboard tire bead seat retaining flange of said inner full face vehicle wheel, said wheel mounting flange being located wholly outside a plane defined by said inboard tire bead seat retaining flange; and
an outer full face vehicle wheel defining an axis and including a wheel rim and a full face wheel disc, said wheel rim including an outboard tire bead seat retaining flange, an outboard tire bead seat, a generally axially extending well, and an inboard tire bead seat surface, said wheel disc including a body having a centrally located wheel mounting flange and an outer annular portion, said outer annular portion of said wheel disc defining an inboard tire bead seat retaining flange of said outer full face vehicle wheel, said wheel mounting flange being located wholly outside a plane defined by said inboard tire bead seat retaining flange; and
each of said inboard tire bead seats of said outer and inner full face vehicle wheels provided with a radially in-turned flange, said in-turned flange including a generally radially inwardly sloping surface, a generally radially extending surface, and an axially extending surface;

wherein, when said radially extending surface of said in-turned flange is positioned against an adjacent inner surface of said inboard tire bead seat retaining flange of said wheel disc, a recess is formed between said generally radially inwardly sloping surface of said in-turned flange and said inner surface of said inboard tire bead seat retaining flange and a welding area is formed between said generally axially extending surface of said in-turned flange and said inner surface of said inboard tire bead seat retaining flange, said recess defining an axially extending groove for receiving a first weld, said welding area defining an area for receiving a second weld, said first and second welds cooperating to join said wheel rim and said wheel disc together and produce said respective inner and outer full face vehicle wheels for use in said high offset dual vehicle wheel assembly.

2. The high offset dual vehicle wheel assembly defined in claim 1 wherein said generally radially extending surface of said in-turned flange of said wheel disc extends a predetermined minimum generally radially extending distance which is effective to ensure that said first weld and said second weld do not burn through to contact one another and thereby affect the integrity of the associated weld joints.

3. The high offset dual vehicle wheel assembly defined in claim 2 wherein said predetermined minimum radially extending distance is at least about one-half a thickness of the said wheel rim in the region of said inboard tire bead seat.

4. The high offset dual vehicle wheel assembly defined in claim 2 wherein said predetermined minimum radially extending distance is at least about 2 mm.

5. The high offset dual vehicle wheel assembly defined in claim 1 wherein said recess is a first recess and defines a first axially extending groove for receiving said first weld, said in-turned flange further includes a non-radially extending surface between said generally radially extending surface and said generally axially extending surface so that when said radially extending surface of said in-turned flange is positioned against said adjacent inner surface of said inboard tire bead seat retaining flange of said wheel disc, a second recess is formed between said generally non-radially extending surface of said in-turned flange and said inner surface of said inboard tire bead seat retaining flange, said second recess defining an second axially extending groove for receiving a second weld.

6. The high offset dual vehicle wheel assembly defined in claim 1 wherein said inner full face vehicle wheel and said outer full face vehicle wheel are formed from steel.

7. The high offset dual vehicle wheel assembly defined in claim 1 wherein said inner full face vehicle wheel and said outer full face vehicle wheel are formed from aluminum.

8. The high offset dual vehicle wheel assembly defined in claim 1 wherein said wheel mounting flange of said disc is located an axial distance in the range from about 0 mm to about 76 mm from said plane of said inboard tire bead seat retaining flange.

9. The high offset dual vehicle wheel assembly defined in claim 1 wherein at least one of said first weld and said second weld is a continuous, uninterrupted, circumferential weld.

10. A full face vehicle wheel for use in a high offset dual vehicle wheel assembly having a pair of the full face vehicle wheels, the full face vehicle wheel comprising:

a full face vehicle wheel defining an axis and including a wheel rim and a full face wheel disc, said wheel rim including an outboard tire bead seat retaining flange, an outboard tire bead seat, a generally axially extending well, and an inboard tire bead seat surface, said wheel disc including a body having a centrally located wheel mounting flange and an outer annular portion, said outer annular portion of said wheel disc defining an inboard tire bead seat retaining flange of said full face vehicle wheel, said wheel mounting flange being located wholly outside a plane defined by said inboard tire bead seat retaining flange, said inboard tire bead seat of said full face vehicle wheel provided with a radially in-turned flange, said in-turned flange including a generally radially inwardly sloping surface, a generally radially extending surface, and an axially extending surface, wherein, when said radially extending surface of said in-turned flange is positioned against an adjacent inner surface of said inboard tire bead seat retaining flange of said wheel disc, a recess is formed between said generally radially inwardly sloping surface of said in-turned flange and said inner surface of said inboard tire bead seat retaining flange, and a welding area is formed between said generally axially extending surface of said in-turned flange and said inner surface of said inboard tire bead seat retaining flange, said recess defining an axially extending groove for receiving a first weld, said welding area defining an area for receiving a second weld, said first and second welds cooperating to join said wheel rim and said wheel disc together and produce said full face vehicle wheel.

11. The full face vehicle wheel defined in claim 10 wherein said generally radially extending surface of said in-turned flange of said wheel disc extends a predetermined minimum generally radially extending distance which is effective to ensure that said first weld and said second weld do not burn through to contact one another and thereby affect the integrity of the associated weld joints.

12. The full face vehicle wheel defined in claim 11 wherein said predetermined minimum radially extending distance is at least about one-half a thickness of the said wheel rim in the region of said outboard tire bead seat.

13. The full face vehicle wheel defined in claim 11 wherein said predetermined minimum radially extending distance is at least about 2 mm.

14. The full face vehicle wheel defined in claim 10 wherein said recess is a first recess and defines a first axially extending groove for receiving said first weld, said in-turned flange further includes a non-radially extending surface between said generally radially extending surface and said generally axially extending surface so that when said radially extending surface of said in-turned flange is positioned against said adjacent inner surface of said outboard tire bead seat retaining flange of said wheel disc, a second recess is formed between said generally non-radially extending surface of said in-turned flange and said inner surface of said outboard tire bead seat retaining flange, said second recess defining an second axially extending groove for receiving a second weld.

15. The full face vehicle wheel defined in claim 10 wherein said full face vehicle wheel is formed from steel.

16. The full face vehicle wheel defined in claim 10 wherein said full face vehicle wheel is formed from aluminum.

17. The full face vehicle wheel defined in claim 10 wherein said wheel mounting flange of said disc is located an axial distance in the range from about 0 mm to about 76 mm from said plane of said inboard tire bead seat retaining flange.

18. The full face vehicle wheel defined in claim 11 wherein at least one of said first weld and said second weld is a continuous, uninterrupted, circumferential weld.

* * * * *